(12) United States Patent
Rayeski

(10) Patent No.: US 9,740,244 B2
(45) Date of Patent: Aug. 22, 2017

(54) COLOR CHANGING COVER

(71) Applicant: Otter Products, LLC, Fort Collins, CO (US)

(72) Inventor: Jonathan B. Rayeski, Fort Collins, CO (US)

(73) Assignee: Otter Products, LLC, Fort Collins, CO (US)

( * ) Notice: Subject to any disclaimer, the term of this patent is extended or adjusted under 35 U.S.C. 154(b) by 0 days.

(21) Appl. No.: 15/209,854

(22) Filed: Jul. 14, 2016

(65) Prior Publication Data

US 2017/0023982 A1    Jan. 26, 2017

Related U.S. Application Data

(60) Provisional application No. 62/195,658, filed on Jul. 22, 2015.

(51) Int. Cl.
G06F 1/16 (2006.01)
H04B 1/3888 (2015.01)

(52) U.S. Cl.
CPC ......... *G06F 1/1656* (2013.01); *H04B 1/3888* (2013.01)

(58) Field of Classification Search
CPC ............................ G06F 1/1656; H04B 1/3888
See application file for complete search history.

(56) References Cited

U.S. PATENT DOCUMENTS

| 8,428,644 B1 | 4/2013 | Harooni |
| 2004/0156192 A1 | 8/2004 | Kerr et al. |
| 2004/0204014 A1* | 10/2004 | Colorado .......... H04M 1/72547 455/550.1 |
| 2005/0073829 A1* | 4/2005 | Burger ................. H05B 33/08 362/84 |
| 2006/0098395 A1 | 5/2006 | Cheng |
| 2012/0302294 A1 | 11/2012 | Hammond et al. |
| 2013/0017788 A1* | 1/2013 | Norair ................ H04M 1/0254 455/41.2 |
| 2013/0260835 A1* | 10/2013 | Sikora ............... H05B 33/0803 455/566 |

(Continued)

FOREIGN PATENT DOCUMENTS

CN    204145557 U    2/2015

OTHER PUBLICATIONS

LitCoat—PRNewswire Article—Oct. 17, 2004.

*Primary Examiner* — Lewis West

(57) ABSTRACT

A cover system for an electronic device may include a cover and a set of non-transitory computer instructions. The cover at least partially covers the installed electronic device. The cover may include a power storage device, an outer surface including a color changing region that includes a phosphor layer that luminesces when energized by an electrical signal, and an electrode for conducting the electrical signal to the phosphor layer. The cover may also include communication circuitry configured to receive a data communication from the installed portable electronic device and electrical circuitry configured to generate the electrical signal in response to receiving the data communication. The set of non-transitory computer instructions may direct a computer processor of the electronic device to establish a communication session with the communication circuitry of the cover to transmit the data communication to the cover.

23 Claims, 2 Drawing Sheets

(56) References Cited

U.S. PATENT DOCUMENTS

2014/0179375 A1  6/2014  Yang et al.
2014/0200054 A1* 7/2014  Fraden ................ H04M 1/0254
                                                        455/575.8

* cited by examiner

COLOR CHANGING COVER

CROSS REFERENCE TO RELATED APPLICATIONS

This application claims priority to and benefit of U.S. Provisional Patent Application No. 62/195,658, filed Jul. 22, 2015, which is incorporated by reference herein.

FIELD

This disclosure relates generally to covers, encasements, and housings for use with portable electronic devices.

BACKGROUND

Portable electronic devices are commonly used for communication, entertainment, and/or information purposes. Portable electronic devices include devices such as smartphones, cellular phones, mobile communication devices, computers, portable computing devices, mobile computing devices, tablet computers, cameras, video players, audio players, electronic media readers, two-way radios, global positioning satellite (GPS) devices, and/or other types of electronic computing or communication devices, including combinations thereof.

Users often want to customize the look and feel of their portable electronic devices by adding a cover or case that includes a particular color or design. However, many users also wish to change the look of the cover or case that encloses their portable electronic device in order to coordinate the case with their clothing, or simply to change the look of the cover or case as they desire. Such changes require that the current encasement must be removed from the portable electronic device, and a different case with a different appearance is installed on the portable electronic device. This necessitates additional time and effort, as well as the expense of having multiple cases for a single portable electronic device. In some situations, users may also wish to protect their portable electronic device.

SUMMARY

A cover system for a portable electronic device having a computer processor is provided. The cover system may include a protective cover and a set of non-transitory computer instructions and/or a set of computer instructions stored on a non-transitory computer readable medium. The protective cover at least partially covers the portable electronic device when the portable electronic device is installed in the protective cover. The protective cover may include a power storage device, an outer surface including a color changing region that includes a phosphor layer that luminesces when energized by an electrical signal, and an electrode for conducting the electrical signal to the phosphor layer to energize the phosphor layer. The protective cover may also include communication circuitry configured to receive a wireless data communication from the installed portable electronic device and electrical circuitry configured to generate the electrical signal in response to receiving the wireless data communication. The set of non-transitory computer instructions may, when executed by the computer processor of the portable electronic device, direct the computer processor to establish a wireless communication session with the communication circuitry of the protective cover and transmit the wireless data communication to the protective cover.

In some examples, a cover system in accordance with the examples herein may not include the non-transitory computer instructions. In other examples, data communication between the protective cover and the portable electronic device may be conducted through wired means rather than using wireless communication techniques and components. In yet other examples, a cover, encasement, or case may not necessarily be protective or may have minimal protective characteristics.

DETAILED DESCRIPTION OF THE DISCLOSURE

In the following detailed description, various specific details are set forth in order to provide an understanding of and describe the apparatuses and techniques introduced here. However, the techniques may be practiced without the specific details set forth in these examples. Various alternatives, modifications, and/or equivalents will be apparent to those skilled in the art without varying from the spirit of the introduced apparatuses and techniques. For example, while the embodiments described herein refer to particular features, the scope of this solution also includes embodiments having different combinations of features and embodiments that do not include all of the described features. Accordingly, the scope of the techniques and solutions introduced herein are intended to embrace all such alternatives, modifications, and variations as fall within the scope of the claims, together with all equivalents thereof. Therefore, the description should not be taken as limiting the scope of the invention, which is defined by the claims.

The present disclosure is directed to encasements and housings for portable electronic devices that can change color when instructed to do so, either by depressing a button or switch on the encasement itself, or by using a software application running on the portable electronic device. The color changes of the encasement are due to electroluminescence of a phosphor material applied to the encasement, e.g. by painting or spraying, or integrated with the encasement material itself, e.g. by overmolding. An electrical current is applied to the phosphor material via electrodes, causing it to glow a certain color, depending on the properties of the phosphor material utilized. For example, electroluminescent paints are made by LITCOAT (Cheyenne, Wyo., USA) and by LUMILOR (Austin, Tex., USA) that may be applied to the exterior of an encasement, cover, or shell.

Figure 1A:
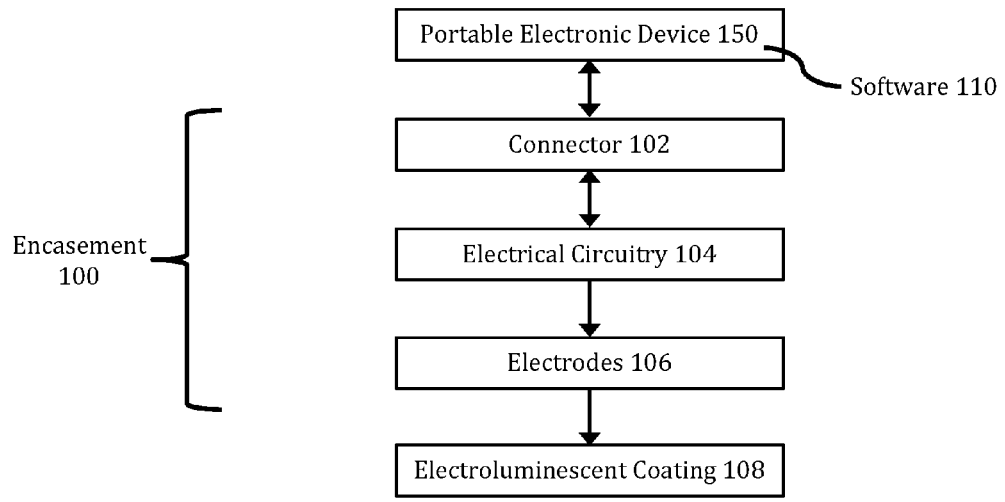
FIG. 1A shows a block diagram of power and data signals transmitted between a portable electronic device and an electroluminescent coating on an encasement via a wired connector.

Encasements, covers, and shells described herein that utilize an electroluminescent paint may include components that allow the encasement, cover, or shell to interact with the portable electronic device it encloses. For example, FIG. 1A shows a block diagram of power and data signals transmitted between a portable electronic device 150 (such as a smartphone or smartwatch) and an electroluminescent paint on an encasement 100 for the portable electronic device via a connector 102 that connects to a power and data port on portable electronic device 150. Encasement 100 includes connector 102 on an inner surface of encasement 100 that can connect with a power/data port of portable electronic device 150 when portable electronic device 150 is inserted into encasement 100. Connector 102 can transmit both electrical power and data signals; exemplary connectors may include, but are not limited to, USB, mini USB, micro USB, LIGHTNING, or 30-pin connectors. Connector 102 is electrically connected to electrical circuitry 104, which can receive data signals from portable electronic device 150 and respond appropriately.

Electrical circuitry 104 can control the flow of power from portable electronic device 150, turning it on or off depending on the input received. In some instances, electrical circuitry 104 may send data signals back to portable electronic device 150 via connector 102. Electrical circuitry 104 is connected to electroluminescent coating 108 by at least two electrodes 106a and 106b. When electrical current is directed into the electrodes 106a-b, and onto the electroluminescent coating 108, the coating luminesces. For example, alternating current may be used to activate the coating, and the frequency oscillation of the current may cause the fluorescence. In some instances, the oscillation frequency and/or magnitude may be modified to change the color emitted by the electroluminescent coating 108.

The electrical circuitry 104 may include a DC to AC converter or inverter that creates AC power that is applied to the electroluminescent material. In some configurations, encasement 100 may be powered by portable electronic device 150. In other configurations, encasement 100 may include its own power source, such as a battery, a rechargeable battery, a supercapacitor, a solar cell, and/or another type of power source or power storage device.

Figure 1B:
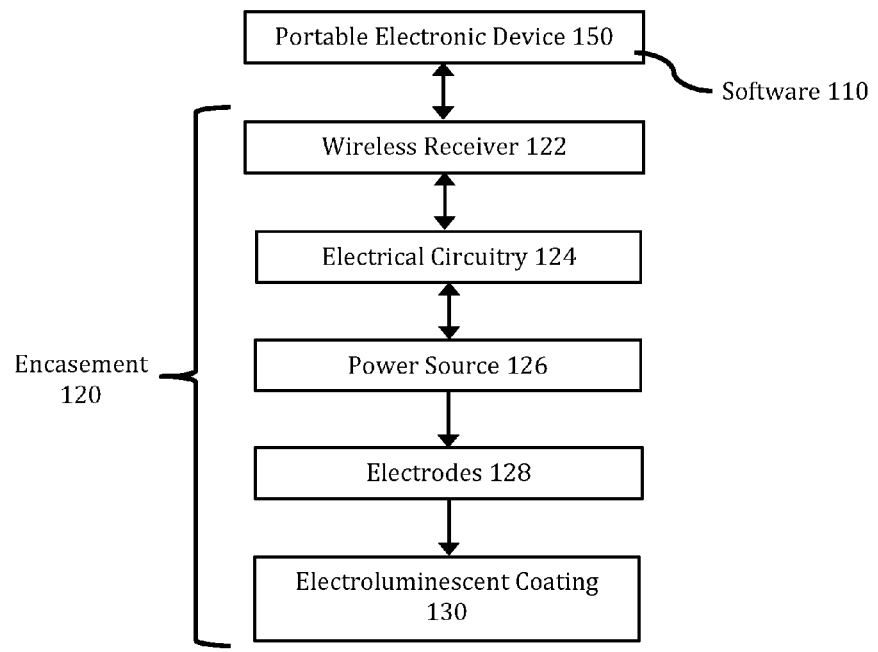
FIG. 1B shows a block diagram of power and data signals transmitted between a portable electronic device and an electroluminescent coating on an encasement via a wireless signal.

FIG. 1B shows an alternative arrangement of a color changing encasement 120, in which portable electronic device 150 communicates wirelessly with electrical circuitry 124 of the encasement 120 to manipulate the color of light emitted. Encasement 120 includes electrical circuitry 124 that includes a wireless receiver 122, either attached to the encasement's inner surface or embedded within the walls of the encasement. In some instances, a wireless transmitter may also be included, to allow the encasement to provide a feedback data signal to portable electronic device 150. Exemplary wireless standards that may be utilized for communication between portable electronic device 150 and electrical circuitry 124 may include, but are not limited to, RFID, NFC, BLUETOOTH, and BLUETOOTH-Low energy. The electrical circuitry 124 receives and interprets the data signals emitted by the portable electronic device 150 in order to turn on, turn off, and modulate the luminescence of the encasement 120. Beneficially, portable electronic device 150 can send commands to encasement 120 without have to establish a physical electrical connection between portable electronic device 150 and encasement 120. Either of encasement 100 or encasement 120 may also be or include a protective encasement, a cover, a protective cover, a shell, a protective shell, a case, and/or a protective case.

A power source 126 attached to the encasement, e.g. a direct current power source, provides the current for the encasement rather than being provided by portable electronic device 150 itself. This may prevent power drain from portable electronic device 150 itself. In some embodiments, power source 126 may be a battery, such as a lithium ion battery. In some embodiments, the power source may be a small replaceable battery that provides enough current to allow for electroluminescence to occur. Electrodes 128 allow electrical current to flow to an electroluminescent coating 130, thus stimulating coating 130 and causing fluorescence.

Figure 2A:
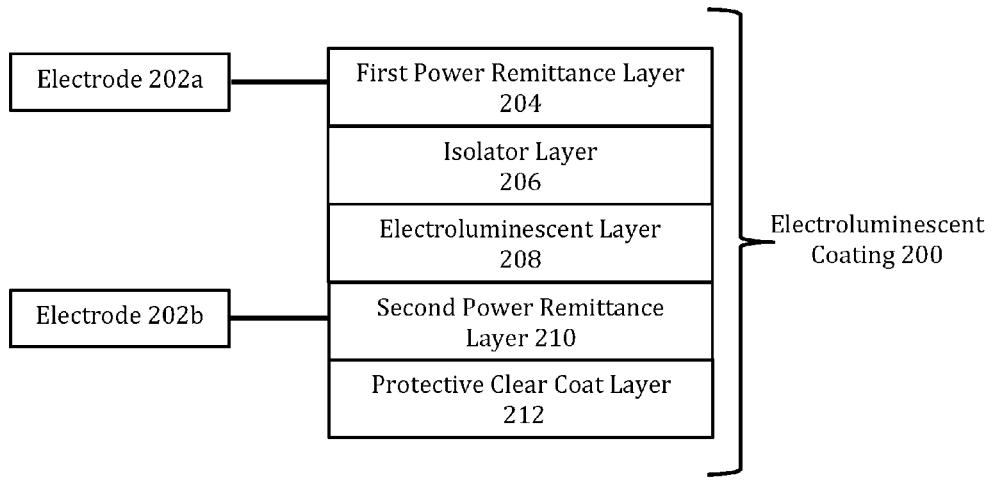
FIG. 2A shows a schematic diagram of electrodes connected to power remittance layers for a single color electroluminescent coating.

In some instances, an electroluminescent coating may be made of multiple layers. For example, FIG. 2A shows a diagram of an exemplary electroluminescent coating 200 made of several layers. Electrodes 202a and 202b supply current to a first power remittance layer 204, and a second power remittance layer 210. The first power remittance layer 204 may be applied to the surface of the encasement. An isolator layer 206 may be applied over first power remittance layer 204, and then an electroluminescent layer 208 may be applied over isolator layer 206. Electroluminescent layer 208 includes a substance, such as a phosphor, that luminesces when excited by current supplied by the electrodes. Second power remittance layer 210 is applied on top of electroluminescent layer 208, and a clear protective coat layer 212 is applied to the second power remittance layer in order to protect the other layers from physical damage.

Figure 2B:
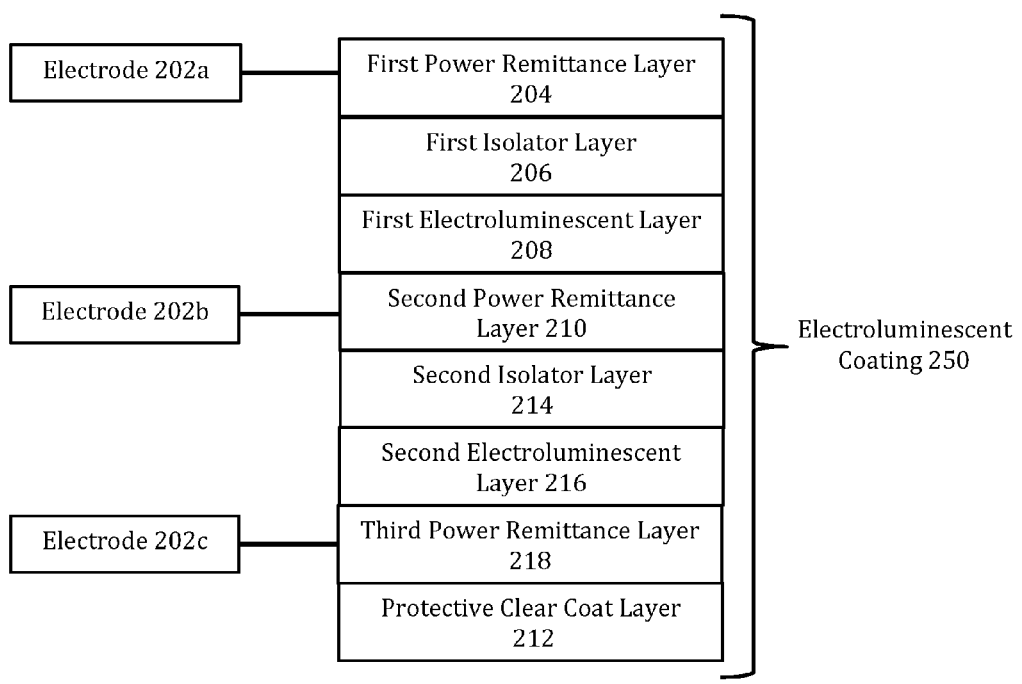
FIG. 2B shows a schematic diagram of an electroluminescent coating that includes two electroluminescent layers.

In some instances, multiple electroluminescent layers containing different phosphors may be used in a coating, thus increasing the diversity of colors that may be displayed on an encasement, shell, or cover. FIG. 2B shows a diagram of an exemplary electroluminescent coating 250 that contains multiple electroluminescent layers. As in FIG. 2A, electrode 202a is in electrical communication with first power remittance layer 204, and first isolator layer 206 covers first power remittance layer 204. Electroluminescent layer 208 is applied on top of isolator layer 206, and is covered by second power remittance layer 201. Electrode 202b is in electrical communication with second power remittance layer 210. However, instead of being covered by a protective clear coat layer, a second isolator layer 214 may be applied on top of second power remittance layer 210. A second electroluminescent layer 216 may be applied on the second isolator layer 214, followed by a third power remittance layer 218 in electrical communication with an electrode 202c. A protective clear coat layer 212 may then be applied on top of the third power remittance layer to protect the entire coating from physical damage.

The sequence of an isolator layer, an electroluminescent layer, and an additional power remittance layer may be stacked on previous layers repeatedly for each additional phosphor color that is added. In this way, multiple phosphors that emit different wavelengths of light may be utilized in a single coating. Moreover, use of multiple electroluminescent layers may be excited simultaneously and in different combinations, producing different colors or a larger variety of colors than may be achievable by exciting only a single electroluminescent layer. For example, a first energized or activated electroluminescent layer may emit a color A, and a second energized or activated electroluminescent layer may emit a color B. If both layers are excited simultaneously, a third color C (the combination of colors A and B) may be emitted. The more phosphor layers are added, the more color combinations that are possible.

In some instances, the electroluminescent layers may be controlled by a software application, or app, running on one or more computer processors of the portable electronic device that is at least partially covered by the encasement, enclosure, or shell.

The software application may be used to activate and deactivate an electroluminescent layer on an encasement, as well as selectively activating and deactivating groups of electroluminescent layers within a coating. The software application may be used to select from a variety of colors and/or intensities allowing the user to customize the encasement. The software application may allow the user to manually select colors and/or intensities and/or may allow the user to make a choice of a desired color or desired intensity from among preselected colors and/or intensities.

In some embodiments, the software application may automatically or semi-automatically select or suggest a color or intensity based on analysis of an image stored in or accessed using the portable electronic device. In further embodiments, the software application may interface with a camera on the portable electronic device, such that a color in an image captured by the portable electronic device camera (e.g. a colored building, a car, clothing, etc.) is analyzed. The software application may automatically or semi-automatically select or suggest a color intensity based on the analysis of the captured image. The software application may then command the encasement to partially or completely match the color using the electroluminescent coating on the encasement. The color of the encasement may change automatically, may request approval from the user before changing, or may suggest a variety of related choices from with the user selects. Beneficially, a user can customize the encasement, using the software application, to coordinate with any image or object of their choice. In some configurations, the software application may be configured to identify contrasting colors in addition to or in place of coordinating colors.

In some embodiments, the app may allow the user to communicate with a second portable electronic device that has a copy of the application loaded and its own electroluminescent encasement. The communication may allow the user to also control the electroluminescent output of the second encasement. The communication may also allow the user to send a selected color choice to the second portable electronic device permitting a user of the second portable electronic device to approve the color choice before the color of the encasement associated with the second portable electronic device is changed.

In some embodiments, an encasement may have different electroluminescent regions or sections that can be separately controlled or driven to display different colors. The arrangement enables the encasement to simultaneously display different colors in patterns or configurations related to the layout of the different regions or sections. The software application may also suggest coordinating, contrasting, or alternating colors for the various regions or sections and may select those colors based on an image as described above. In some embodiments, the colors for the various regions or sections may be selected from among multiple images.

In some embodiments, the software application may store previously used or selected colors such that a user can quickly and efficiently select from among previously used colors.

The software or software application may be executed by one or more computer processors of the portable electronic device, by a smartphone, and/or by another computing device. The software application may be stored on a non-transitory medium and/or may include non-transitory computer processor readable and/or executable instructions which are downloaded from a remote server, such as a server associated with an application "store," over one or more computer networks. The software application may also be stored in a memory in the encasement and loaded into the portable electronic device from the encasement. In some configurations, the software app may be downloaded to and executed on the portable electronic device.

The above figures may depict exemplary configurations for an apparatus of the disclosure, which is done to aid in understanding the features and functionality that can be included in the housings described herein. The apparatus is not restricted to the illustrated architectures or configurations, but can be implemented using a variety of alternative architectures and configurations. Additionally, although the apparatus is described above in terms of various exemplary embodiments and implementations, it should be understood that the various features and functionality described in one or more of the individual embodiments with which they are described, but instead can be applied, alone or in some combination, to one or more of the other embodiments of the disclosure, whether or not such embodiments are described and whether or not such features are presented as being a part of a described embodiment. Thus the breadth and scope of the present disclosure, especially in any following claims, should not be limited by any of the above-described exemplary embodiments.

Terms and phrases used in this document, and variations thereof, unless otherwise expressly stated, should be construed as open ended as opposed to limiting. As examples of the foregoing: the term "including" should be read to mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. Additionally, where a range is set forth, each of the upper and lower limits of the stated range are inclusive of all of the intermediary units therein.

The foregoing description is intended to illustrate but not to limit the scope of the disclosure, which is defined by the scope of the appended claims. Other embodiments are within the scope of the following claims.

What is claimed:

1. A cover system for a portable electronic device having a computer processor, the cover system comprising:
   a protective cover that at least partially covers the portable electronic device when the portable electronic device is installed in the protective cover, the protective cover comprising:
   a power storage device;

an outer surface including a color changing region that includes a phosphor layer that luminesces when energized by an electrical signal;

an electrode for conducting the electrical signal to the phosphor layer to energize the phosphor layer;

communication circuitry configured to receive a wireless data communication from the installed portable electronic device; and electrical circuitry connected to the power storage device and to the electrode, the electrical circuitry configured to generate the electrical signal based at least on a desired color or a desired intensity of the color changing region in response to receiving the wireless data communication; and a set of non-transitory computer instructions which, when executed by the computer processor of the portable electronic device, direct the computer processor to establish a wireless communication session with the communication circuitry of the protective cover and transmit the wireless data communication to the protective cover, the wireless data communication including information indicating the desired color or the desired intensity, wherein the set of non-transitory computer instructions, when executed, further direct the computer processor to generate the information indicating the desired color or the desired intensity based on an image accessible by the computer processor.

2. The cover system of claim 1 wherein the phosphor layer of the color changing region comprises an electroluminescent coating.

3. The cover system of claim 1 wherein the color changing region further includes a second phosphor layer disposed over the phosphor layer and connected to the electrical circuitry through another electrode, the second phosphor layer configured to produce a second color that is different than a color produced by the phosphor layer.

4. The cover system of claim 3 wherein the phosphor layer and the second phosphor layer are separated by at least an isolator layer.

5. The cover system of claim 1 wherein the outer surface includes a second color changing region in an area of the outer surface that is different than an area of the color changing region, the second color changing region including a second phosphor layer that luminesces when energized by a second electrical signal, the second color changing region configured to produce a second color that is different than a first color produced by the first color changing region.

6. The cover system of claim 5, wherein the wireless data communication includes information indicating a desired color or a desired intensity of the second color changing region, and wherein the set of non-transitory computer instructions, when executed, direct the computer processor generate the information indicating the desired color or the desired intensity of the second color changing region based on the image accessible by the computer processor.

7. The cover system of claim 5 wherein each of the color changing region and the second color changing region are distributed across different portions of the outer surface to produce a pattern comprising the first color and the second color.

8. The cover system of claim 5 wherein the outer surface includes a third color changing region configured to produce a third color that is different than the first color and the second color.

9. The cover system of claim 1 wherein the communication circuitry includes components for establishing at least one of a Bluetooth and a Bluetooth Low Energy communication session with the portable electronic device to receive the wireless data communication.

10. The cover system of claim 1 wherein:
the electrical signal comprises alternating current;
the protective cover further comprises a direct current (DC) to alternating current (AC) converter; and
at least one of a frequency and a magnitude of the alternating current is varied based on the desired color or the desired intensity.

11. The cover system of claim 1 wherein the image accessible by the computer processor includes an image produced by a camera of the portable electronic device.

12. The cover system of claim 1 wherein the set of non-transitory computer instructions is stored in a memory of the protective cover and the electrical circuitry of the protective cover is configured to transmit the non-transitory computer instructions for delivery to the installed portable electronic device using the communication circuitry.

13. A cover system for a portable electronic device having a computer processor, the cover system comprising:
a cover that at least partially covers the portable electronic device when the portable electronic device is installed in the cover, the cover comprising:
a power storage device;
an outside surface including a first color changing region having a first phosphor layer that luminesces when energized by an electrical signal;
an electrode for conducting the electrical signal to the phosphor layer to activate the phosphor layer;
an electrical connector attached to an inside surface of the cover and configured to electrically interconnect with an electrical interface of the installed portable electronic device; and
electrical circuitry connected to the power storage device and to the electrode, the electrical circuitry configured to generate the electrical signal in response to information regarding a color selection received from the installed portable electronic device through the electrical connector wherein the electrical circuitry generates the electrical signal based at least on a desired color or a desired intensity of the phosphor layer; and
a set of non-transitory computer instructions which, when executed by the computer processor of the portable electronic device, direct the computer processor to transmit the information regarding the color selection to the cover through the electrical interface and the electrical connector, wherein the set of non-transitory computer instructions, when executed, further direct the computer processor to generate the information indicating the desired color or the desired intensity based on an image accessible by the computer processor.

14. The cover system of claim 13 wherein the first color changing region further includes a second phosphor layer disposed over the first phosphor layer and connected to the electrical circuitry through another electrode, the second phosphor layer configured to produce a color that is different than a color produced by the first phosphor layer.

15. The cover system of claim 13 wherein the outside surface includes a second color changing region, the second color changing region configured to produce a color that is different than a color produced by the first color changing region.

16. The cover system of claim 15 wherein each of the first color changing region and the second color changing region are distributed across different areas of the outside surface, respectively, to produce a contrasting pattern comprising the first color and the second color.

17. A protective cover for an electronic device having a computer processor, the protective cover comprising:
- a shell that at least partially covers the electronic device when the electronic device is installed in the shell, the shell having an outer surface including a color changing region, the color changing region including one or more phosphor layers that luminesce when energized by one or more electrical signals to change a color of the color changing region;
- one or more electrodes for conducting the one or more electrical signals to the one or more phosphor layers of the color changing region, respectively, to energize the one or more phosphor layers;
- communication circuitry configured for receiving a data communication from the installed electronic device, the communication circuitry including wireless communication circuitry and an antenna, the wireless communication circuitry configured to receive the data communication through the antenna in a wireless communication session established with the installed electronic device;
- electrical circuitry connected to the one or more electrodes and to the communication circuitry, the electrical circuitry configured to generate the one or more electrical signals based at least on a desired color or a desired intensity of the color changing region in response to color choice information received in the data communication from the installed electronic device to generate the color at the color changing region, wherein information indicating the desired color or the desired intensity is included in the data communication received through the antenna in the wireless communication session established with the installed electronic device; and
- a memory storing non-transitory computer processor executable instructions, wherein the electrical circuitry is further configured to transmit the non-transitory computer processor executable instructions to the installed electronic device using the communication circuitry, wherein the set of non-transitory computer instructions, when executed, further direct the computer processor to generate the information indicating the desired color or the desired intensity based on an image accessible by the computer processor.

18. The protective cover of claim 17 wherein the protective cover further includes a battery for providing electrical power at least to the communication circuitry and the electrical circuitry.

19. The protective cover of claim 18 wherein the battery is rechargeable and the rechargeable battery further provides at least a portion of the electrical power to the installed electronic device.

20. The protective cover of claim 13, wherein the image accessible by the computer processor includes an image produced by a camera of the portable electronic device.

21. The protective cover of claim 17, wherein the image accessible by the computer processor includes an image produced by a camera of the electronic device.

22. The cover system of claim 15, wherein the electrical circuitry generates the electrical signal based on a desired color or a desired intensity of the second color changing region, and wherein the set of non-transitory computer instructions, when executed, direct the computer processor generate the information indicating the desired color or the desired intensity of the second color changing region based on the image accessible by the computer processor.

23. The protective cover of claim 17, wherein the outside surface includes a second color changing region, the second color changing region configured to produce a color that is different than a color produced by the first color changing region, wherein the electrical circuitry generates the electrical signal based on a desired color or a desired intensity of the second color changing region, and wherein the set of non-transitory computer instructions, when executed, direct the computer processor generate the information indicating the desired color or the desired intensity of the second color changing region based on the image accessible by the computer processor.

* * * * *

UNITED STATES PATENT AND TRADEMARK OFFICE
CERTIFICATE OF CORRECTION

| | |
|---|---|
| PATENT NO. | : 9,740,244 B2 |
| APPLICATION NO. | : 15/209854 |
| DATED | : August 22, 2017 |
| INVENTOR(S) | : Jonathan B. Rayeski |

It is certified that error appears in the above-identified patent and that said Letters Patent is hereby corrected as shown below:

In the Claims

Column 7, Line 54, Claim 6 the phrase "generate the information" should read --to generate the information--.

Column 10, Line 25, Claim 22 the phrase "computer processor" should read --computer processor to--.

Column 10, Line 37, Claim 23 the phrase "processor generate" should read --processor to generate--.

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*